Nov. 22, 1966     F. J. PETRASY     3,286,755
ARRANGEMENT FOR RETAINING A FASTENER ON A WIRING OR OTHER DEVICE
Original Filed Aug. 15, 1960

INVENTOR
Frank J. Petrasy
BY
ATTORNEY

United States Patent Office 3,286,755
Patented Nov. 22, 1966

3,286,755
ARRANGEMENT FOR RETAINING A FASTENER ON A WIRING OR OTHER DEVICE
Frank J. Petrasy, Bridgeport, Conn., assignor to Westinghouse Electric Corporation, Pittsburgh, Pa., a corporation of Pennsylvania
Original application Aug. 15, 1962, Ser. No. 217,197, now Patent No. 3,189,058, dated June 15, 1965. Divided and this application Jan. 28, 1965, Ser. No. 428,827
1 Claim. (Cl. 151—69)

This application is a division of an earlier application Serial Number 217,197 filed on August 15, 1962, by F. J. Petrasy, now U.S. Patent No. 3,189,058 issued June 15, 1965.

The present invention relates to a structural arrangement for retaining a fastener on an article and more particularly to such an arrangement for retaining a ridged or threaded mounting fastener or a wiring device.

In the manufacture of various commercial articles, it is often desirable to supply as a part of the marketed product any fasteners needed for attaching or mounting the product relative to some other object such as a wall or the like. Securance of such fasteners to the articles during manufacture is usually preferred in order to safeguard against loss of the fasteners during storage or transit. The arrangement and method by which the fasteners are detachably or otherwise secured to the articles should for obvious reasons be optimally economized. For example, in the wiring device market sector, the number of wall mounted articles or devices, such as receptacles and switches, which are sold each year is in the millions and therefore any savings, even on the order of a mil, in the attachment of wall mounting fasteners to such devices constitutes a material economy.

It is recognized that there are existing arrangements which provide for detachable securance of fasteners to articles with which they are to be used for mounting or other purposes. If the fastener is provided with a head and a threaded shank and if the latter is passed through an opening in the article, such as an opening in the yoke of a wiring device, a threaded metallic nut can be employed to hold the fastener against withdrawal through the article opening, but mass economics renders this approach prohibitive if the nut is not necessary in placing the article in use. Thus, in the case of mounting a wiring device for use, a threaded fastener is normally inserted through each of opposite ends of an elongated yoke of the device and threaded into threaded openings in a standard wall outlet box so that threaded nuts are not needed to retain the fasteners in mounted position. In marketing wiring devices, it has therefore been more economical normally to employ less expensive and suitably sized cardboard or other flexible washers to retain the threaded mounting fasteners in secured relation to "on-self" devices, with the washers being either left in place or detached as desired when the devices are mounted for use.

In accordance with the general principles of the present invention, a very efficient and comparatively economic arrangement is employed to secure an elongated ridged or threaded fastener to a commercial article or wiring device. The securing arrangement comprises an elongated element of wire engaged against the fastener so as to be limited by a fastener ridge or thread against longitudinal movement therealong and so as to be withheld against laterally directed removal therefrom. In other respects, the wire extends laterally outward of the fastener so as to hold the fastener against withdrawal through an article or wiring device yoke opening through which the fastener extends. The structural makeup of the wire element further is so characterized as to adapt it for convenient attachment to the article by automatic assembly line techniques.

It is therefore an object of the invention to provide a novel and efficient arrangement for securing a fastener to an article.

It is another object of the invention to provide a novel and efficient arrangement which is adapted for securing a fastener to an article and which is further adapted to being conveniently placed in its securance relationship by automatic assembly line techniques.

Another object of the invention is to provide a novel and efficient arrangement which secures a fastener to an article and which need not be removed when the article is placed in use.

These and other objects of the invention will be more fully understood upon consideration of the following detailed description along with the attached drawing, in which.

Figure 1:
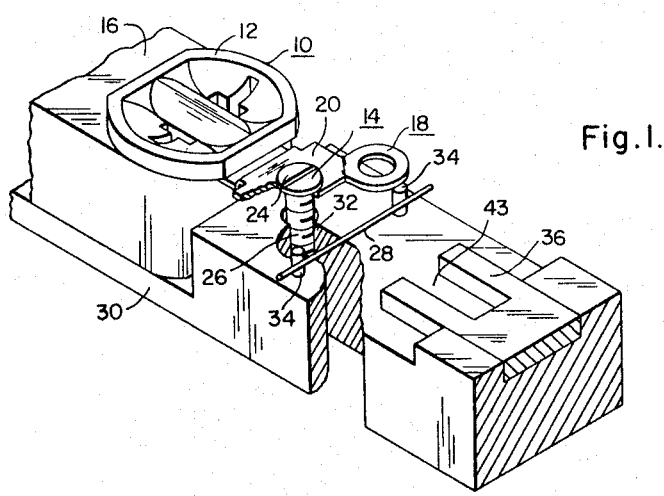
FIGURE 1 is a partial perspective view of a wiring device stationed on a block for securance of a length of wire around a fastener thereof.
Figure 2:
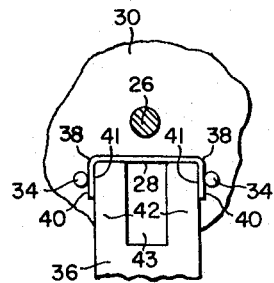
FIGS. 2, 3 and 4 are respective partial views of a longitudinal section of the arrangement shown in FIG. 1 showing various stages of the securance of the wire to the wiring device fastener.
Figure 5:
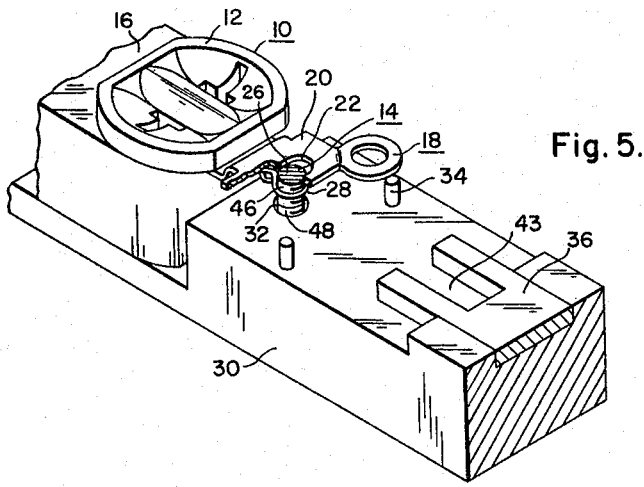
FIG. 5 is a view similar to that shown in FIG. 1 showing the wiring device after the wire has been engaged with the fastener.

In FIGS. 1 and 5 there is shown an article 10 in the form of a wiring device or receptacle 12 to which a fastener 14 is to be attached by a securing arrangement for later use in mounting the article 10. If the article 10 is a wiring device, then the latter can be provided in forms other than that of a receptacle, such as that of a switch.

The receptacle 12 includes an elongated insulative housing 16 (of which only a part is shown) and an elongated metallic mounting yoke 18 which extends along the entire length of the housing 16. At each end of the yoke 18, there is provided a longitudinally outward projecting mounting ear 20 having an opening 22 for receipt of the mounting fastener 14.

The fastener 14 in this case preferably includes an enlarged head 24 and an elongated threaded shank 26, but other fasteners, such as fasteners having a shank with one or more ridges, can be employed. Thus, the receptacle 12 can be placed in use by inserting respective fasteners 14 through the opening 22 in each yoke and mounting ear 20 and threading the respective fasteners 14 into respective threaded openings in a wall outlet box (not shown) so as to mount the receptacle 12 relative thereto.

The securing arrangement of the present invention provides for attachment of the fastener(s) 14 to the receptacle 12 through the employment of a wire element 28 which in this instance is an initially straight element with a predetermined length. Thus, the wire 28 is engaged with the fastener 14 so as to prevent the latter from being removed through the yoke opening 22 during transit and storage. When it is desired to mount the receptacle 12, the wire 28 can be disengaged from the fastener 14 and discarded or, particularly if it is disposed sufficiently close to the back side of the associated yoke ear 20, it can be left in place and mounting of the receptacle 12 can then be accomplished in the manner already described.

To engage the wire 28 with the fastener 14, it is preferred that the receptacle 12 be held in a relatively stationary position as by seating the receptacle 12 on an elongated fixture block 30. The threaded fastener shank 26 is placed through the yoke opening 22 until the fastener head 24 is engaged against the front side of the associated yoke ear 20. In order to hold the fastener 14 against substantial pivotal movement while the wire 28 is being engaged with the fastener shank 26, the shank 26 can further be extended into an opening 32 in the block 30.

The wire 28 can be placed so as to extend across a pair of suitably spaced wire forming lugs 34 projecting outwardly from the block 30. A wire forming arm 36 can then be employed to engage the wire 28 with the fastener shank 26. Although the entire operation of engaging the wire 28 about the fastener shank 26 can be accomplished manually without the use of the block 30 and the wire forming lugs 34 and arm 36, it is preferred that these method aids or equivalent mechanistic apparatus be employed in the wire forming operation so as to effect a cost economy in mass production. As a further economy, cooperative automatic machinery (not shown) can be employed to unreel, cut to proper length, and place the wire 28 in suitable position for the wire forming operation.

Figure 3:
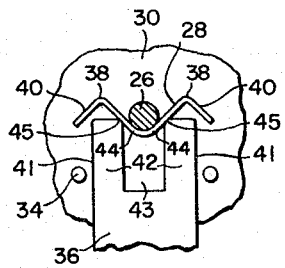

As shown in FIG. 3, when the wire forming arm 36 has advanced a given amount, the wire 28 is caused to pass between the wire forming lugs 34, and since the wire 28 is longer than the spacing between the lugs 34 by a predetermined amount, approximately and preferably right angle or substantial angle bends or elbows 38 are formed in the wire 28 so as to produce substantially perpendicular end wire portions or arms 40. The elbow forming operation just described can be omitted if wire elements having suitable end arms are available, and ordinary staples represent a satisfactory example of such wire elements. When the wire forming arm 36 has advanced further, a central portion 44 of the wire 28 engages the fastener shank 26 and begins to wrap therearound. With still further advancement of the wire forming arm 36, spaced end fingers 42 of the wire forming arm 36 advance beyond the fastener shank 26 and cause substantial wrapping of the wire 28 around the fastener shank 26.

The wire arms 40 promote guidance of the wire 28 to the fastener shank 26 since these arms respectively engage finger outer sides 41 to hold the wire 28 against movement laterally of the wire forming arm 36 during forward movement of the latter. The wire arms 40 also promote wrapping of the wire 28 around the fastener shank 26 when the wire forming arm fingers 42 begin to advance beyond the fastener shank 26. This is because the fingers 42 produce a continuous wrapping torque on each end of the wire 28 when they engage the wire elbows 38 and then advance along the wire arms 40.

Figure 4:
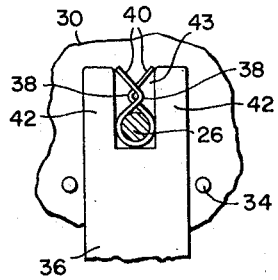

As can be observed in all of the figures, a slot 43 between the wire forming fingers 42 receives the wire 28 and the fastener shank 26 as the fingers 42 advance to the terminal position shown in FIG. 4. To ensure efficient wrapping of the wire 28 around the fastener shank 26 in accordance with the dynamics just described, the wire 28 should be of such diameter and of such resilient character as to lead to ready bending of the central wire portion 44 rather than any substantial unbending of the elbows 38 during the forming arm advancement period after cam portions 45 of the arm fingers 42 have reached the elbows 38.

As shown in FIG. 4, bending of the central wire portion 44 can continue until the elbows 38 cross each other, but in any event the elbows 38 need only be sufficiently close to each other to prevent lateral withdrawal of the wire 28 from the shank 26. The central wire portion 44 is bent around a substantial perimetrical portion of the shank 26 and otherwise is disposed between and at least partially inwardly of the outer diameter of the threads 46 and 48 as shown in FIG. 5. Preferably, the threads 46 and 48 are located close to the back side of the associated yoke ear 20 to provide for stability in the fastener securance and also to render removal of the wire 28 unnecessary when the receptacle 12 is mounted. However, the threads 46 and 48 can be located toward the outer end of the fastener shank 26, but in such case the wire 28 would probably have to be removed from the fastener shank 26 when the receptacle 12 is mounted in order to eliminate interference with the threading operation performed during the mounting process. In any event, the wire arms 40, and if desired the wire elbows 38, then extend laterally of the fastener shank 26 to be engageable against the back side of the associated yoke mounting ear 20 and prevent removal of the fastener 14 through the yoke opening 22.

Fasteners other than threaded fasteners can also be secured to an article by use of the invention. This would be true for example of a fastener having an elongated shank which is provided with one or more protruding ridges which provide an abutment or stop portion for limiting movement of the wire 28 at least in the outward longitudinal direction along the fastener shank. This result can be effected if the central wire portion 44 is at least partially within the outer diameter of the ridge or ridges as described in connection with the fastener 14. Further, although the wire engagement operation is here shown as being accomplished in the longitudinal direction of the article 10, it can also be accomplished from other directions so long as sufficient space is available for the necessary wire bending to occur.

With reference once more to FIG. 5, when the wire 28 has been secured to the fastener shank 26 as shown, the wire forming arm 36 is withdrawn and another article or the other end of the article 10 can be placed for a repeat operation. If desired, both ends of the receptacle 12 or article 10 can be acted upon simultaneously if a pair of opposed arms 36 are employed.

The foregoing description has been set forth only to point out the principles of the invention. Accordingly, it is desired that the invention not be limited by the description set forth, but rather that it be accorded an interpretation consistent with the scope and spirit of its broad principles.

What I claim is:

An arrangement for securing a fastener against removal from an opening in a wiring device mounting yoke through which a threaded shank of said fastener extends, said arrangement comprising an elongated wire element, said wire element having an arm at each end thereof bent to one side at a substantial angle, a central portion of said wire element joined with said arms through respective elbow portions and extending laterally around said fastener shank so that the wire side opposite said one wide side faces said fastener shank, said central wire portion extending around a perimetrical portion of said shank by more than 180 degrees and being limited against longitudinal withdrawal from said fastener along said fastener shank by adjacent threads of said shank, said wire element having a cross sectional diameter less than the pitch of said adjacent threads so that said wire element is disposed at least partially inwardly of the outer diameter of said threads, said elbow portions of said wire arms being sufficiently proximate to each other in separate planes to prevent withdrawal of said wire element laterally of said fastener shank, said wire arms diverging in a direction away from said shank and engageable with an undersurface of said yoke adjacent said yoke opening to limit withdrawal movement of said shank through said yoke opening, said central wire portion extending sufficiently around said fastener shank for opposite end portions of said central wire portion to cross each other to thereby dispose said elbow portions beyond said opposite side of said central wire portion.

References Cited by the Examiner
UNITED STATES PATENTS

| | | | |
|---|---|---|---|
| 1,892,544 | 12/1932 | Wanders | 151—69 |
| 2,314,489 | 3/1943 | Fennema | 151—69 |
| 2,948,317 | 8/1960 | Munro | 151—69 |

CARL W. TOMLIN, *Primary Examiner.*

EDWARD C. ALLEN, *Examiner.*

R. S. BRITTS, *Assistant Examiner.*